July 16, 1940.      E. HOLLMANN      2,207,806

CONTROLLING MEANS FOR AIRCRAFT CATAPULTS

Filed Dec. 24, 1937

Inventor:
Emil Hollmann,
by Richards & Geier
Attorneys.

Patented July 16, 1940

2,207,806

UNITED STATES PATENT OFFICE 2,207,806

CONTROLLING MEANS FOR AIRCRAFT CATAPULTS

Emil Hollmann, Kiel, Germany, assignor to Deutsche Werke Kiel Aktiengesellschaft, Kiel, Germany, a corporation of Germany Application December 24, 1937, Serial No. 181,506
In Germany March 22, 1935

8 Claims. (Cl. 244—63)

The present invention relates to controlling means for aircraft catapults.

According to the present invention a catapult starting lever is automatically moved into the starting position once this movement has been initiated by hand. In this manner accidents are avoided that otherwise might occur if the starting lever be not moved into the starting position, once this movement has been started, but is either stopped in an intermediate position, or is moved back into its rest position.

In order that the invention may be clearly understood and readily carried into effect reference is made to the accompanying drawing which shows diagrammatically and by way of example controlling means in accordance with the present invention.

Figure 1:
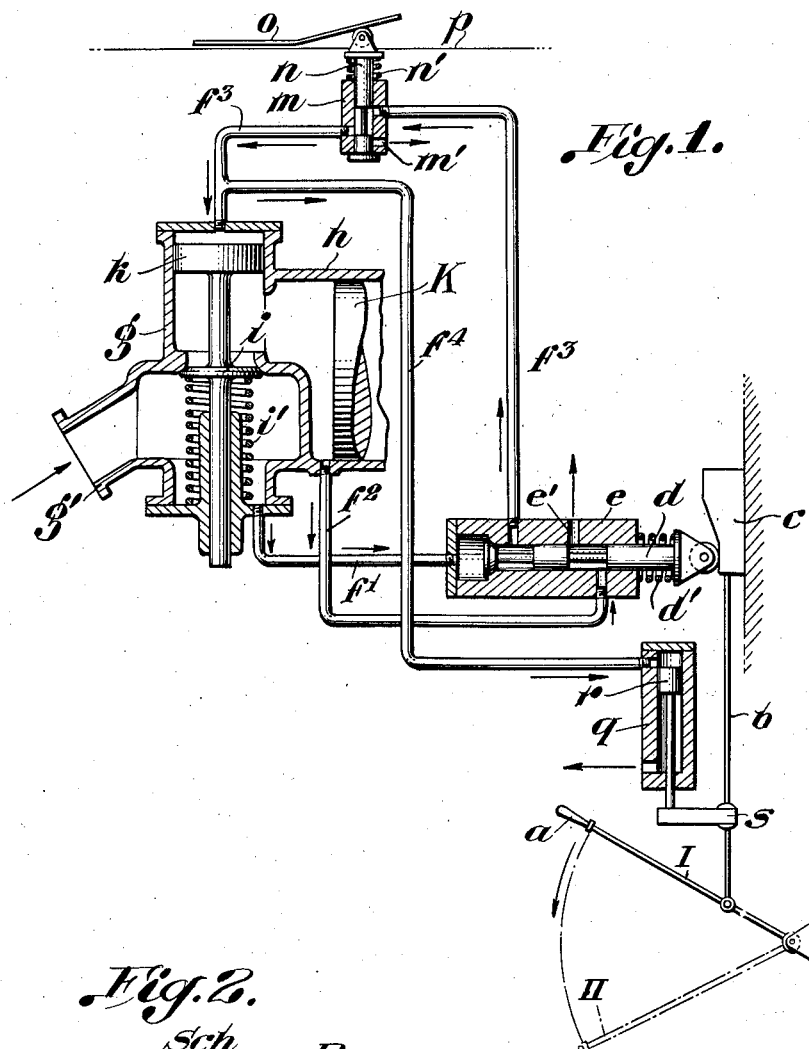
Figure 1 is a diagram illustrating the controlling device.
Figure 2:
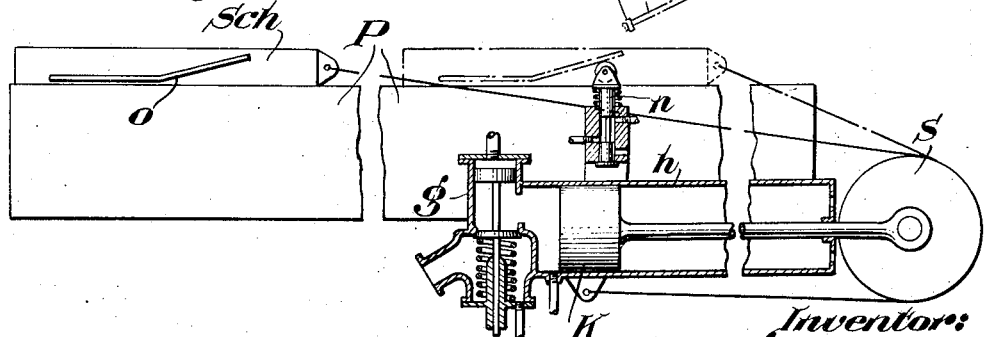
Figure 2 shows diagrammatically the combination of the controlling device with the catapult.

Referring to the drawing the catapulting action is released by means of a starting lever $a$, its rest position being indicated at I and its starting position at II. The starting lever $a$ is connected by a rod $b$ with a wedge $c$ which acts on a slidable member $d$. The slide member $d$ is maintained in its rest position by means of a spring $d'$ and works in a housing $e$ which is provided with a channel $e'$ leading into the atmosphere and is connected through three pipes $f'$, $f^2$, $f^3$ with a valve casing $g$. The valve casing $g$ is connected by a flanged annulus $g'$ to a pipe (not shown) leading the pressure medium, e. g. air pressure, for actuating the catapult. The valve casing $g$ forms part of or is connected with a cylinder $h$, wherein a piston $k$ is adapted to exert a catapulting action in a known manner by means of a cable passing over the pulley S and attached to a carriage Sch (Fig. 2), the said piston being actuated by the said pressure medium. In the rest position of the catapult the pressure medium is shut off from the cylinder $h$ by a valve $i$ which is held in the closed position by the said pressure medium, and by a spring $i'$. A piston $k$ is connected with the valve $i$, the said piston $k$ working in the upper part of the valve casing. The pipe $f^3$ leads to the space above the piston $k$. A further control member is interpolated in the pipe $f^3$, the said control member comprising a slide member $n$ adapted to work in a housing $m$. The slide member $n$ is held in its rest position by a spring $n'$. A control rail or rod $o$ acts upon this slide member, the said control member $o$ being mounted on a member of the catapult actuated during the catapulting operation. A pipe $f^4$ is branched off the pipe $f^3$ before the latter enters the valve casing $g$, the pipe $f^4$ leading into a housing $q$ wherein is provided a slidable member $r$ which is connected by a strap $s$ with the rod $b$ of the starting lever $a$.

When the starting lever $a$ is moved from its rest position I in the direction of the arrow, in order to start the catapulting action, the slide member $d$ is displaced by the wedge $c$ in such manner, that the pressure medium entering through the pipe $f^1$ from the valve casing $g$ into the housing $e$ enclosing the slidable member $d$ can flow through the pipe $f^3$ into the space above the piston $k$ in the valve casing $g$. This causes the piston $k$ to be forced down, and the valve $i$ to be opened in order that the pressure medium can enter into the cylinder $h$, and can there act on the working piston of the catapult. The pipe $f^2$ which connects the cylinder $h$, in the rest position of the slide member $d$ through the channel $e'$ with the atmosphere, is closed during that time by the slidable member $d$.

The pressure medium flows simultaneously from the pipe $f^3$ into the pipe $f^4$ and thereby displaces the slide member $r$ in the housing $q$, so that it moves the starting lever $a$ into the starting position II by means of the strap.

Thereby, after the starting movement of the starting lever has been initiated by hand, the lever $a$ is moved into its starting position, independently of any further action of the operator attending to the starting lever $a$.

Towards the end of the catapulting operation the slide member $n$ is forced down by the control rail $o$, thereby cutting off communication through the pipe $f^3$ with the slide member housing $e$, and at the same time connecting the pipe $f^3$ leading to the valve casing $g$, with the atmosphere through a channel $m'$ in the slide member housing $m$. The space above the piston $k$ is therefore unloaded, so that the valve $i$ is no longer maintained in the open position by the piston $k$. The valve therefore closes by the action of the spring $i$ and the pressure medium acting on it from below. By connecting this part of the pipe $f^3$ with the atmosphere, the pipe $f^4$ is also discharged and thus the slide member $r$ becomes unloaded, so that the starting lever $a$ can again be moved by hand into its rest position I.

I claim:

1. A launching apparatus for a flying machine, said launching apparatus comprising means for moving the flying machine, means supplying a compressed fluid to the first-mentioned means for actuating the same and including a valve through which the compressed fluid flows on its way to the first-mentioned means while said valve is open, means supplying a compressed fluid to said valve to maintain it open, a lever device movable from an inoperative position to an operative position, means connected with said lever device and the third-mentioned means for preventing the flow of the second-mentioned compressed fluid to said valve when said lever device is in its inoperative position and for causing the flow of the compressed fluid to said valve when said lever device is in its operative position, and means connected with said lever device for causing it to complete its movement from said inoperative position to said operative position after said movement has once been started.

2. A launching apparatus for a flying machine, said launching apparatus comprising means for moving the flying machine, means supplying a compressed fluid to the first-mentioned means for actuating the same and including a valve through which the compressed fluid flows on its way to the first-mentioned means while said valve is open, means connected with the second-mentioned means and with said valve for removing a part of the compressed fluid from the second-mentioned means and for supplying it to said valve to maintain said valve open, the third-mentioned means including a device for interrupting the flow of said part of the compressed fluid to said valve and for removing it from the valve to close said valve and thereby interrupt the flow of the compressed medium to the first-mentioned means, a lever movable from an inoperative position to an operative position, means connected with said lever and the third-mentioned means for actuating the third-mentioned means, and means connected with said lever for causing said lever to complete its movement from said inoperative position to said operative position after said movement has once been started.

3. A launching apparatus for a flying machine, said launching apparatus comprising means for moving the flying machine, means supplying a compressed fluid to the first-mentioned means for actuating the same and including a valve through which the compressed fluid flows on its way to the first-mentioned means while said valve is open, means supplying a compressed fluid to said valve to maintain it open and including another valve comprising a valve casing having passages formed therein for the flow of the second-mentioned compressed fluid, and a valve body movable in said valve casing to establish a connection between said passages and to interrupt this connection; a lever movable from an inoperative position to an operative position, means connected with said lever and engaging said valve body to move the same and thereby establish a connection between said passages when said lever is moved to said operative position, and means connected with said lever for causing said lever to complete its movement from said inoperative position to said operative position after said movement has once been started.

4. A launching apparatus for a flying machine, said launching apparatus comprising means for moving the flying machine, means supplying a compressed fluid to the first-mentioned means for actuating the same and including a valve through which the compressed fluid flows on its way to the first-mentioned means while said valve is open, means supplying a compressed fluid to said valve to maintain it open and including another valve comprising a valve casing having passages formed therein for the flow of the second-mentioned compressed fluid, and a valve body movable in said valve casing to establish a connection between said passages and to interrupt this connection; a lever movable from an inoperative position to an operative position, a rod connected with said lever, a wedge connected with said rod, said rod and said wedge being movable along with said lever, means connected with said valve body and engaging said wedge, whereby a movement of said lever to said operative position causes a movement of said valve body to establish a connection between said passages, and means connected with said rod for causing said lever to complete its movement from said inoperative position to said operative position after said movement has once been started.

5. A launching apparatus for a flying machine, said launching apparatus comprising means for moving the flying machine, means supplying a compressed fluid to the first-mentioned means for actuating the same and including a valve through which the compressed fluid flows on its way to the first-mentioned means while said valve is open, means supplying a compressed fluid to said valve to maintain it open, a lever movable from an inoperative position to an operative position, a rod connected with said lever, means connected with said rod and the third-mentioned means for preventing the flow of the second-mentioned compressed fluid to said valve when said lever is in its inoperative position, an auxiliary piston, means connecting said auxiliary piston with said rod, and means supplying a compressed fluid to said auxiliary piston to cause said lever to complete its movement from said inoperative position to said operative position after said movement has once been started.

6. A launching apparatus for a flying machine, said launching apparatus comprising means for moving the flying machine, means supplying a compressed fluid to the first-mentioned means for actuating the same and including a valve through which the compressed fluid flows on its way to the first-mentioned means while said valve is open, means connected with the second-mentioned means and with said valve for removing a part of the compressed fluid from the second-mentioned means and for supplying it to said valve to maintain said valve open, a lever movable from an inoperative position to an operative position, means connected with said lever and the third-mentioned means for providing a flow of said part of the compressed fluid from the second-mentioned means to said valve as soon as a movement of said lever from said inoperative position to said operative position has been started, means connected with said lever for causing said lever to complete its movement from said inoperative position to said operative position after said movement has once been started, and means connecting the third-mentioned means with the fifth-mentioned means to supply a portion of the compressed fluid from the third-mentioned means to the fifth-mentioned means to actuate the latter.

7. A launching apparatus for a flying machine, said launching apparatus comprising means for moving the flying machine, a casing for transmitting a compressed fluid to said means for actuating the same, a valve casing having a passage for said compressed fluid formed therein, a valve body movable within said valve casing and adapted to close said passage, an auxiliary piston connected with said valve body, means connected with said casing and said valve casing for removing a part of the compressed fluid from said casing and for supplying it to said auxiliary piston to maintain said valve open, a lever movable from an inoperative position to an operative position, means connected with said lever and the second-mentioned means for preventing the flow of said part of the compressed fluid from said casing to said auxiliary piston when said lever is in its inoperative position, and means connected with the second-mentioned means for supplying a portion of the compressed fluid from the second-mentioned means to actuate said lever and cause it to complete a movement from said inoperative position to said operative position after said movement has once been started.

8. A launching apparatus for a flying machine, said launching apparatus comprising means for moving the flying machine, means supplying a compressed fluid to the first-mentioned means for actuating the same and including a valve through which the compressed fluid flows on its way to the first-mentioned means while said valve is open, means supplying a compressed fluid to said valve to maintain it open, means connected with said third-mentioned means for interrupting the flow of the second-mentioned compressed fluid to said valve close to the end of the launching action, a lever device movable from an inoperative position to an operative position, means connected with said lever device and the third-mentioned means for preventing the flow of the second-mentioned compressed fluid to said valve when said lever device is in its inoperative position and for causing the flow of said compressed fluid to said valve when said lever device is in its operative position, and means connected with said lever device for causing it to complete its movement from said inoperative position to said operative position after said movement has once been started.

EMIL HOLLMANN.